United States Patent [19]
Thompson

[11] 3,933,040
[45] Jan. 20, 1976

[54] FLOWMETER

[75] Inventor: Henry Christian Thompson, Huntington Bay, N.Y.

[73] Assignee: Metco, Inc., Westbury, N.Y.

[22] Filed: Nov. 7, 1973

[21] Appl. No.: 413,721

[52] U.S. Cl. ................................. 73/208
[51] Int. Cl.² .......................................... G01F 1/22
[58] Field of Search.................................. 73/208, 3

[56] References Cited
UNITED STATES PATENTS

| | | | |
|---|---|---|---|
| 1,641,744 | 9/1927 | Decker | 73/208 |
| 2,727,388 | 12/1955 | Ekstrom | 73/208 |
| 3,408,865 | 11/1968 | Chenault | 73/208 |
| 3,686,945 | 8/1972 | Piette | 73/208 |

Primary Examiner—James J. Gill
Assistant Examiner—Anthony V. Ciarlante
Attorney, Agent, or Firm—Burgess, Dinklage & Sprung

[57] ABSTRACT

A flowmeter for measuring the quantitative flow of fluids such as gases passing therethrough is disclosed and includes a housing forming at its upper end a centrally located tubular guide. The housing has a centrally located chamber which terminates at its upper end at the tubular guide. The chamber is in communication with a gas outlet. A gas tube is mounted in the chamber and has a fluid escape slot which opens to the chamber. The gas tube communicates at its lower end with a gas inlet. A float is provided which is adapted to slidably move up and down within the gas tube and the tubular guide of the housing. A sight glass is mounted on the upper portion of the housing co-axial with the float for viewing movement of the upper portion of the float therein. The sight glass is sealed at its upper end forming fluid shock absorbing means to accommodate and compensate for rapid upward and downward movement of the float.

4 Claims, 3 Drawing Figures

FLOWMETER

BACKGROUND

This invention relates to a fluid flowmeter of the variable orifice-type. More particularly, this invention relates to an improved flowmeter for measuring the quantitative flow of fluids such as gases passing therethrough which is characterized by a piston-like float member which closely fits in a float guide to eliminate undesirable oscillations and cooperates with a shock absorbing chamber in the form of a sealed sight glass above the piston-like float for compensating for rapid upward and downward movement of the float.

Orifice-type fluid flowmeters are well-known in the art. Meters of this type operate on the principal of measuring the pressure drop across a restrictive orifice placed in the flow line. Such meters may use a fixed size orifice, such as a hole in a plate, in which case there is a pressure drop of the fluid from a point in front of the plate to a point behind the orifice. This pressure drop is a function of the flow.

It is also known to construct orifice flowmeters with a variable orifice and a constant pressure drop. In such meters the size of the orifice is a function of the flow. Such variable orifice-type meters have been constructed with a tapered tube, in which a fixed size "float" such as a spherical ball is placed. The float is urged upstream in the tapered tube by a predetermined force. The inside diameter of the tube tapers in such a direction as to be larger downstream. Normally, meters of the variable orifice type are made so as to function in a vertical position with the direction of flow upwards through the tube thereby relying on the force of gravity to urge the float downward.

Another type of variable orifice flow meters are those using a tube with a constant diameter and a vertical fluid escape slot or row of holes. These tubes are used with an elongated float which slides up and down inside the constant diameter tube. U.S. Pat. No. 341,841 to Gleason of May 11, 1886, and U.S. Pat. No. 1,238,498 to Dawley of Aug. 28, 1917, describe flowmeters of this general type.

Fluid flowmeters of the type referred to above and exemplified in the Gleason and Dawley patents have not been entirely successful from a commercial standpoint for several reasons. One is that the elongated float member is susceptible to oscillation due to the action of a fluid, such as a gas, passing through the meter. This makes an accurate reading of the meter difficult and in instances where precise metering is required, this operates as a serious drawback.

Another problem encountered is the rapid upward movement of the indicator member due to a surge of in-flowing gas. This can cause uncontrolled rapid upward movement of the indicator resulting in damage to the meter itself and loss of calibration. Uncontrolled downward movement of the indicator when the gas flow stops can have similar undesirable effects.

The present invention overcomes drawbacks encountered with prior flowmeters by providing an improved construction which eliminates oscillation and provides shock absorption means for accommodating and compensating for rapid upward and downward movement of a float member.

SUMMARY

The present invention provides an improved flowmeter for quantitatively measuring the flow of fluids such as gases passing therethrough and comprises:

a. a housing forming at its upper end a centrally located tubular guide which extends in the axial direction a suitable length so as to provide a good sliding-sealing contact surface;

b. the housing having a centrally located chamber terminating at its upper end at the tubular guide and communicating with the gas outlet;

c. a gas tube mounted in the chamber having a fluid or gas escape slot opening to the chamber in the housing and communicating at its lower end with a gas inlet;

d. a float adapted to slidably move up and down within the gas tube and the tubular guide of the housing; and e. a sight glass mounted on the upper portion of the housing co-axially with the float for viewing the movement of the upper portion of the float therein, said sight glass being sealed at its upper end forming a fluid shock absorbing chamber to accommodate and compensate for rapid upward and downward movement of the float.

In a preferred embodiment means are provided to change the axial position of the gas tube in the housing chamber for calibrating the flowmeter.

DESCRIPTION OF THE DRAWING

The present invention will be more fully understood from the following description taken in conjunction with the accompanying drawing wherein.

DESCRIPTION

Figure 1:
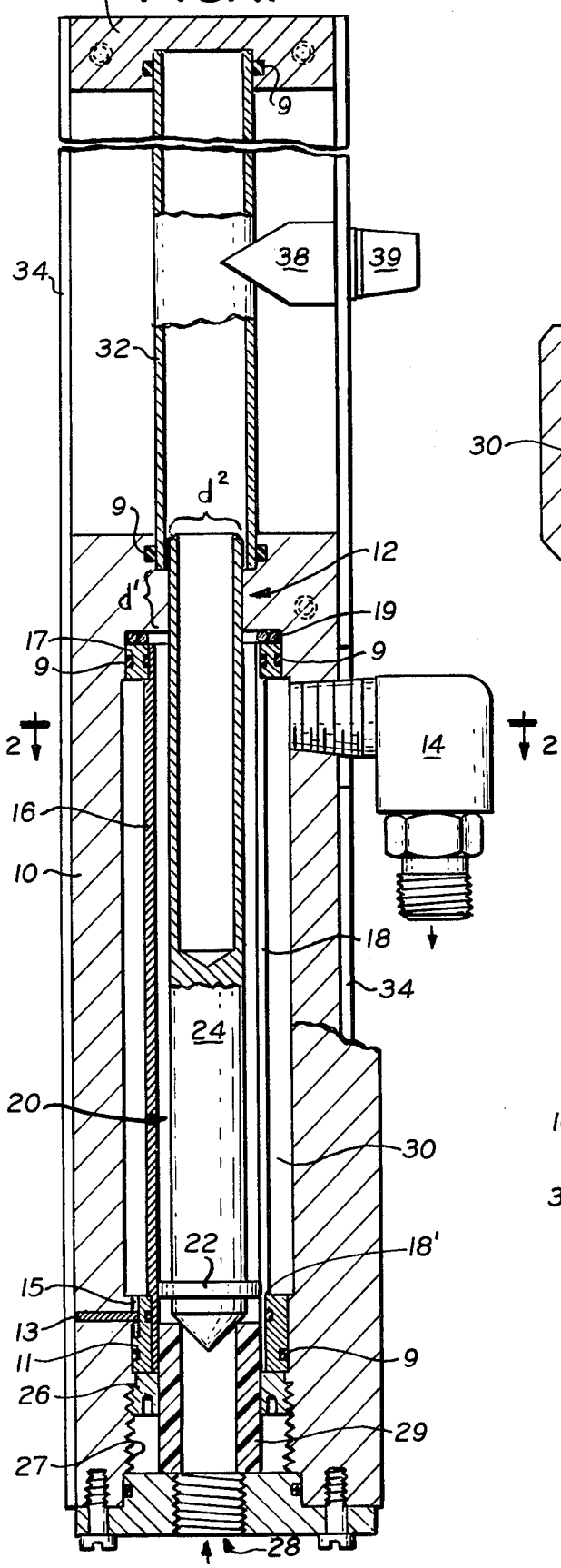
FIG. 1 is a vertical sectional view partly broken away of an improved flowmeter according to the invention.
Figure 2:
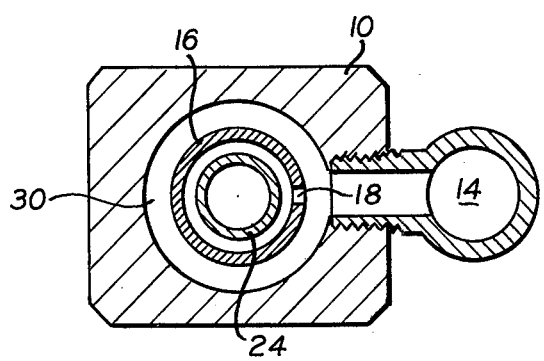
FIG. 2 is a sectional view taken along line 2—2 of FIG. 1.

Referring now to the drawing and in particular to FIGS. 1 and 2 thereof, the improved flowmeter of the invention is shown to include a housing 10 which is preferably generally vertically positioned. The housing 10 forms tubular guide 12 at its upper end. According to a preferred embodiment, the tubular guide 12 extends axially a suitable length $d^1$ so as to provide a good sliding-sealing contact surface. For instance, $d^1$ preferably is at least 0.1 times diameter $d^2$. The housing 10 has a centrally located chamber 30 which terminates at its upper end at the tubular guide 12 and communicates with gas outlet 14.

Gas tube 16 is mounted centrally of chamber 30 and has a vertical gas escape slot 18 which opens to chamber 30 (note especially FIG. 2 of the drawing).

The gas tube 16 is mounted centrally of the housing chamber 30 by means of a lower collar member 11 and an upper collar member 17 each of which is sealed against the leakage of gas by means of O-rings 9 between the gas tube 16 and the respective collar members 11 and 17 and the housing itself 10. Lower collar member 11 is provided with a vertical slot 15 into which pin member 13 fits to orient the gas tube 16 and the outlet slot 18 in a desired direction, for instance in the direction of the gas outlet 14 as shown in FIG. 1.

At the lower end of the housing 10 is gas inlet 28 which communicates with the lower end of the gas tube 16 via adjustable collar 26. Collar 26, which screws into the lower portion of the housing 10 via internal threads 27 makes it possible to change the axial position of the gas tube 16 and the starting position 18 of the slot 18 thus changing and calibrating the fluid flowmeter of the invention. A pre-load spring 19 is positioned between the housing 10 and the upper collar member 17 to securely hold the gas tube 16 in place centrally of the chamber 30 while permitting axial movement of the gas tube 16 for calibration of the fluid flowmeter.

A float member 20 is provided which is generally piston-like in configuration. The float 20 can have an enlarged lower portion 22 which slidably fits within the gas tube 16. The portion 24 of the float 20 above the enlarged portion 22 can have a constant diameter as shown in FIG. 1 which is less than the inside diameter of the gas tube 16. The portion 24 of constant diameter of the float 20 is adapted to slidably fit within the tubular guide 12 in the upper portion of the housing 20. If desired, the float 20 can be uniform, i.e., the same diameter throughout, and move up and down within the tube 16 and the guide 12 which in this instance would have the same diameter.

A lower stop collar 29 is positioned so as to arrest downward movement of the float 20 and insure that it comes to rest at a predetermined level when the gas flow ceases. The collar is preferably somewhat soft, e.g., made of nylon or the like to cushion and protect the float 20 when it drops down.

A sight glass 32 is mounted on the upper portion of the housing 10 by means of block member 36 which is supported by frame members 34 which extend downwardly along the sides of the housing 10. The sight glass 32 is sealed at its upper end in block 36 by way of O-ring 9 and the lower portion is sealably mounted in the housing 10 itself via O-ring 9.

Because of the close sliding fit between portion 24 of the float 20 and the tubular guide 12 in the upper portion of the housing 10, oscillation of the float 20 while gas is flowing through the meter is not possible.

The sight glass 32 because of its sealed relationship to the housing 10 and the sliding fit between the float 20 and the tubular guide 12, form a shock absorbing chamber providing a fluid cushion which accommodates and compensates for rapid upward and downward movement of the float member 20 due to an inrush of gas via inlet 28 and termination of the gas flow. In other words, glass chamber 32 damps out oscillations of the float 20.

The upper portion of the float 20 can be hollowed out as shown in FIG. 1 to adjust the weight and dimensions of the float 20 itself.

A pointer member 38 is mounted on one of the frame members 34 via thumb screw member 39 for indicating a predetermined flow.

The flowmeter is calibrated by using different size stop collars 29 and/or by turning calibration collar 26 in a direction so as to raise or lower the axial position of the gas tube 16.

Figure 3:
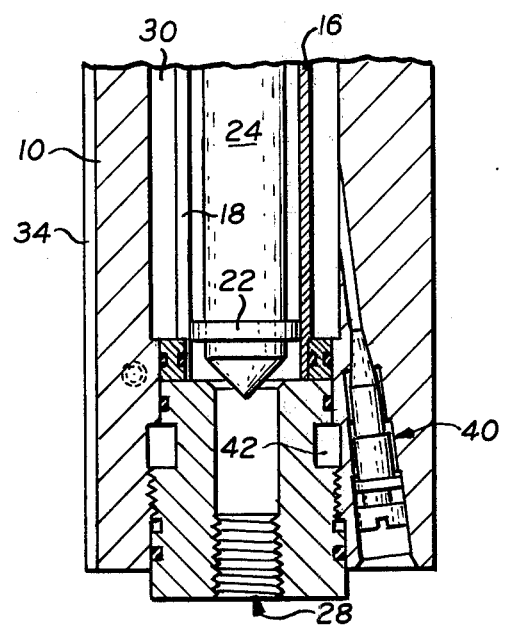
FIG. 3 is a vertical sectional view partly broken away showing an alternate embodiment of the flowmeter of the invention.

In an alternate embodiment as shown in FIG. 3, the meter of the invention can be calibrated by means of a by-pass conduit 42 which connects the gas inlet 28 and the housing chamber 30. The conduit 42 has valve means such as needle valve means 40 for regulating and interrupting the flow of gas through the conduit 42. In this instance, it should be noted that the gas escape slot 18 is oriented away from the gas outlet 14. The slot 18 can be oriented in any direction desired.

In operation, the flowmeter of the invention is connected via inlet 28 to a source of flowing gas for purposes of measuring the quantitative flow of such gas. The flow of such gas is continued downstream of the meter via gas outlet 14. As gas enters the meter, the flow force thereof causes the float 20 to rise and as the incoming gas escapes through the portion of the slot 18 in the tube 16, exposed by upward movement of the float 20, equilibrium is quickly reached and the float comes to rest at a point within the gas tube 16 depending on the flow force of the gas passing through the inlet and the exposed portion of the slot 18 and the tube 16. The amount of gas flowing through the meter can be calibrated and calculated using known physical relationships which can then be directly transcribed to a scale or other such indicia on or associated with the sight glass 32.

Because the sight glass 32 is sealed between upper block member 36 and the housing 10, there is provided a shock absorption chamber to compensate for rapid upward and downward movement of the float 20. The sight glass 32 and float member 20 are able to function this way because of the sliding fit between the portion 24 of the float 20 and the tubular guide 12 over the distance $d^1$. This sliding fit permits air or other gases to move past this sliding fit area to compensate for the position of the float 20.

The present invention also embodies a process for measuring the quantitative flow of fluids utilizing the flowmeter described herein.

The flowmeter of the present invention has several advantages over prior flowmeter devices especially from a process standpoint, for example, in wire spraying equipment which consumes large quantities of air, i.e., 2,000 cubic feet per hour. Prior flowmeter devices capable of handling large flows of air have been found to be bulky and expensive whereas smaller, less expensive devices utilizing a shunt bypass have been found to be inaccurate. The flowmeter of the present invention overcomes the deficiencies encountered in prior devices by being able to accommodate large flows of air and other gases and fluids while at the same time being compact and relatively low in cost per unit.

What is claimed is:
1. Flowmeter comprising:
   a. housing means forming at its upper end a centrally located tubular guide means;
   b. said housing means having a centrally located chamber terminating at its upper end at said tubular guide and communicating with a gas outlet;
   c. gas tube means mounted in said chamber having a gas escape slot opening to said chamber and communicating at its lower end with a gas inlet, calibration means carried by said housing means to change the axial position of the gas tube means;
   d. float means adapted to slidably move up and down within said gas tube means and said tubular guide means, said tubular guide means having a length at least 0.1 times the diameter of said float means so as to provide a good sliding contact surface for the float means as it moves up and down therein; and
   e. sight glass means mounted on the upper portion of the housing means co-axial with the float means and said tubular guide means for viewing movement of the upper portion of the float means therein, said sight glass means being sealed at its upper end forming shock absorbing means to compensate for movement of the float means therein.

2. Flowmeter of claim 1 wherein said float means has a lower enlarged portion adapted to slidably move up and down within the gas tube means, the portion of the float means above said enlarged portion having a constant diameter less than the inside diameter of the gas tube means, said portion above being adapted to slidably fit in the tubular guide means.

3. Flowmeter of claim 1 wherein stop means are provided to arrest downward movement of the float means.

4. Flowmeter of claim 1 wherein a by-pass conduit connects said gas inlet and said chamber, said conduit means having valve means associated therewith for regulating and interrupting the flow of gas therethrough.

* * * * *